(12) United States Patent
Eckl et al.

(10) Patent No.: US 12,126,611 B2
(45) Date of Patent: Oct. 22, 2024

(54) ENGINEERING CONTROL SYSTEM, TECHNICAL INSTALLATION AND METHOD AND SYSTEM FOR AWARDING PUBLICLY TRUSTED CERTIFICATES

(71) Applicant: Siemens Aktiengesellschaft, Munich (DE)

(72) Inventors: Roland Eckl, Forchheim (DE); Harald Herberth, Oberasbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 353 days.

(21) Appl. No.: 17/607,083

(22) PCT Filed: Mar. 27, 2020

(86) PCT No.: PCT/EP2020/058794
§ 371 (c)(1),
(2) Date: Oct. 28, 2021

(87) PCT Pub. No.: WO2020/221528
PCT Pub. Date: Nov. 5, 2020

(65) Prior Publication Data
US 2022/0239641 A1 Jul. 28, 2022

(30) Foreign Application Priority Data

Apr. 29, 2019 (EP) ..................... 19171566

(51) Int. Cl.
*H04L 9/40* (2022.01)
(52) U.S. Cl.
CPC ........ *H04L 63/0823* (2013.01); *H04L 63/062* (2013.01)
(58) Field of Classification Search
CPC ...... H04L 63/0823; H04L 63/062; H04L 9/40
See application file for complete search history.

(56) References Cited

U.S. PATENT DOCUMENTS 6,980,660 B1 * 12/2005 Hind ................... H04W 12/069
713/168
2001/0034834 A1 * 10/2001 Matsuyama .......... H04L 63/062
726/10

(Continued)

FOREIGN PATENT DOCUMENTS

CA 2797081 A1 * 11/2011 ............. E21B 41/00
CA 2875518 C * 4/2018 ........... G06F 21/445

(Continued)

OTHER PUBLICATIONS

PCT International Search Report dated May 7, 2020 based on PCT/EP2020/058794 filed Mar. 27, 2020.

*Primary Examiner* — Jayesh M Jhaveri
(74) *Attorney, Agent, or Firm* — Cozen O'Connor

(57) ABSTRACT

A technical plant, a system for issuing publicly trusted certificates for plant components of the technical plant, an engineering or control system for the technical plant, and a method for issuing publicly trusted certificates for plant components of the technical plant, wherein a) a certification module of a plant component, which is intended to receive a publicly trusted certificate, queries a component identifier; b) the certification module transmits the component identifier together with a certificate request for a publicly trusted certificate to a registration authority; c) the registration authority checks, based on the component identifier, whether the component belonging to the component identifier is assigned to an authorized person or an authorized company; d) if so, the registration authority requests a publicly trusted certificate for the component; and e) the requested publicly trusted certificate is issued and transmitted to the certification module.

21 Claims, 2 Drawing Sheets

(56) References Cited

U.S. PATENT DOCUMENTS

| | | | | |
|---|---|---|---|---|
| 2003/0074555 A1 | * | 4/2003 | Fahn | H04L 9/3263 |
| | | | | 713/156 |
| 2005/0229004 A1 | * | 10/2005 | Callaghan | H04L 9/3268 |
| | | | | 713/185 |
| 2016/0087804 A1 | | 3/2016 | Park et al. | |
| 2016/0360403 A1 | * | 12/2016 | Jordi | H04W 12/06 |
| 2018/0323977 A1 | * | 11/2018 | Hojsik | H04L 63/061 |
| 2020/0053072 A1 | * | 2/2020 | Glozman | H04W 12/08 |

FOREIGN PATENT DOCUMENTS

| | | | | |
|---|---|---|---|---|
| CN | 103986687 | | 8/2014 | |
| CN | 105792201 | | 7/2016 | |
| CN | 107959686 A | * | 4/2018 | H04L 63/0428 |
| WO | 03107710 | | 12/2003 | |

\* cited by examiner

ENGINEERING CONTROL SYSTEM, TECHNICAL INSTALLATION AND METHOD AND SYSTEM FOR AWARDING PUBLICLY TRUSTED CERTIFICATES

CROSS-REFERENCE TO RELATED APPLICATIONS

This is a U.S. national stage of application No. PCT/EP2020/058794 filed 27 Mar. 2020. Priority is claimed on European Application No. 19171566.3 filed 29 Apr. 2019, the content of which is incorporated herein by reference in its entirety.

BACKGROUND OF THE INVENTION

1. Field of the Invention

The invention relates to an engineering or control system for a technical installation, a technical installation and a method for awarding publicly trusted certificates for installation components of a technical installation. In addition, the invention relates to a system for awarding publicly trusted certificates for installation components of a technical installation.

2. Description of the Related Art

Digital certificates are used within the context of technical installations. In particular, if certificates that are used at runtime are involved, then these are also referred to as operative certificates. Certificates allow secure, uncompromised and trusted communication between different installation components, such as devices and/or applications. The use of certificates allows, for example, authentication and communication integrity of communication subscribers to be achieved using cryptographic methodologies.

A public key infrastructure of a technical installation involves the use of registration authorities (RA) in order to receive certificate requests (so-called certificate signing requests (CSR) and to forward them (in the event of approval/validation) to a certificate authority (CA for short). The RA is the instance that decides which certificate requests are approved/validated, and the CA is the instance that creates the certificates.

Installation components can request the certificates that they need, for example, for using various secure protocols, such as Transport Layer Security (TLS) or Open Platform Communications Unified Architecture (OPC UA), themselves. An installation component in the role of a client or requester sends its certificate request to the registration authority (RA), which, in the event of approval/validation, forwards the request to the certificate authority (CA), which is located in the installation (onsite CA) or a trust center (offsite CA or CA as a Service), for example.

Secure connections for webpages (e.g., Hypertext Transfer Protocol Secure (HTTPS) or Secure Web Sockets) are often indispensable from the point of view of what is demanded. This requires certificates.

Particularly in an industrial setting, there are often isolated private networks, and it is frequently the case that devices (or web servers located thereon) are unreachable from the public Internet.

Nevertheless, particularly in a web setting, a very heterogeneous environment exists in which not all subscribers (in particular clients) can be supervised, or included in a managed infrastructure, completely or with little effort. In particular mobile terminals, for example, are often not part of the infrastructure (keyword BYOD—Bring your own device).

In the applicant's view, it is desirable to be able to incorporate all devices (clients as well as servers) into the public infrastructure. Certificates should not be accepted exclusively by supervised terminals on which they have been deposited as trusted, but rather should also be able to be verified by any other terminals, such as mobile terminals, at any time. This would, for example, allow an operator/user to display data, for example, from a controller of a technical installation on a mobile terminal (BYOD).

In the case of browsers on client terminals, this requires certificates in the whole certificate chain all the way up to generally acknowledged trusted root certificates (TRC) to be verifiable (see, for example, the Root CA Policy of Google Chrome). The TRC are a handful of certificates that are classified as trusted across browsers and operating systems and do not need to be installed individually.

If there is no way of checking all the way up to such a TRC, functions can be limited or even not provided based on the lack of checkability. This means that, in the best case, the user receives an error message that can at least be bypassed (confirming that one wishes to proceed despite a failed check is a blatant security risk and inadvisable), or else the function is tacitly simply suppressed (for example, AJAX calls from the page are rejected by the browser or embedded iframes are not shown).

Based on the applicant's level of knowledge, the complexity for obtaining publicly trusted certificates for self-contained installations is currently immense, or this is not possible in the first place.

Certificates are bound by trust. The issuer thus needs to be able to verify and subsequently attest that a requester has control over a domain.

Based on the applicant's knowledge, one way of receiving a publicly trusted certificate is to obtain one manually. This requires the requester of a certificate to identify itself and present various documents that uniquely identify it and ensure that it is authorized/entitled to obtain certificates for the desired domain. A certificate is then transmitted to the requester, who can then install the certificate together with its key material (usually likewise manually) in its domain.

Another way is to use Lets-Encrypt (see, for example, the web site maintained at letsencrypt.org. Here, trust is engendered by virtue of the owner of a server needing to state that it has control over the server and the associated domain. Here, the certificate authority (CA) requires the web server to be reachable directly, however, which means that this approach cannot be used for self-contained networks and areas (LetsEncrypt is based on the ACME protocol). This requirement would not be met for a controller, such as a PLC, of a technical installation with a self-contained network, for example.

Certification management protocols, for example the Certificate Management Protocol (CMP, see, for example, WIKIPEDIA), certainly permit automated execution of certificate requesting, creation and assignment. However, this requires a complete infrastructure that first needs to be set up by the operator of a technical installation. Even if this trouble were to be taken for a self-contained network, it would not be possible to issue publicly trusted certificates in this manner, because an external CA cannot attest to what it is itself unable to verify in an isolated system.

Based on the applicant's level of knowledge, many users in reality therefore currently merely resort to self-signed certificates with all of the aforementioned disadvantages, either because they shy away from the complexity or the costs of manually obtaining publicly trusted certificates or else because use in an industrial installation has sometimes not been able to be accomplished in any other way to date.

SUMMARY OF THE INVENTION

In view of the foregoing, it is therefore an object of the present invention to provide a way of being able to award publicly trusted certificates for components of technical installations having isolated, private networks with a feasible level of complexity.

This and other objects and advantages are achieved in accordance with the invention by a method for awarding publicly trusted certificates for installation components of a technical installation, in which
  a) a certification module retrieves at least one preferably unique component identifier from at least one component of a technical installation that is supposed to receive a publicly trusted certificate, and/or generates at least one preferably unique component identifier for at least one component of a technical installation that is supposed to receive a publicly trusted certificate,
  b) the certification module transmits the at least one retrieved and/or at least one generated component identifier together with a certificate request for a publicly trusted certificate for the at least one component to a registration authority (RA),
  c) the registration authority (RA) uses the at least one component identifier to check whether the at least one component related to the component identifier is associated with at least one authorized person or at least one authorized company that bears responsibility for the at least one component,
  d) if this is the case, then the registration authority (RA) requests a publicly trusted certificate for the at least one component, and
  e) the requested publicly trusted certificate is created and transmitted to the certification module and preferably stored in a protected area in particular of the certification module.

In other words, the invention provides for providing a certification module that can be used to uniquely identify components that are supposed to receive a publicly trusted certificate, or that can be used to generate at least one preferably unique and/or temporary identifier for the components that are to be certified, in particular if components have not yet been started up and therefore it is not (yet) possible to call up an identifier from them.

Instead of the components, the certification module then contacts a central service and transmits to the central service the (respective) certificate request for a publicly trusted certificate for the preferably uniquely identified component(s), or component(s) uniquely identifiable on the basis of the generated identifier(s), together with the identifier(s).

The registration authority can then use the retrieved or generated preferably unique identifier(s) that has/have been made available to check whether the (respective) identified/identifiable component can be associated with a person or a company that has responsibility for the component, in particular that has ownership of the component. The person or the company is preferably a customer that has purchased the component. A component being the responsibility of the person or the company means in particular that the person or the company has control over the component, this preferably being assured by contract, and/or that contractual regulations are in place concerning what consequences there are should any misuse of the requested certificate occur.

The at least one component identifier can, for example, be a serial number and/or a machine/device certificate and/or a fingerprint and/or a type designation. Accordingly, in one development, a serial number and/or a device or machine certificate and/or a fingerprint and/or a type designation is retrieved and/or generated as component identifier in step a).

It may be that a person or a company (manually) provides contractual assurance that the requirement of control of the component is met. The existence of such contractual assurance can then be detected or identified or queried by the registration authority as part of the check.

It is also possible for a database, such as a customer database, to be accessed in order to check whether there is an association between a component that is to be certified and a person/company that bears the responsibility.

Accordingly, in one embodiment, the check during step c) includes the registration authority searching a database, which stores component identifiers together with related authorized persons and/or companies that are preferably the owner of related components, for at least one entry for the component identifier transmitted together with the certificate request. Related components should be understood here to mean components related to the deposited component identifiers. It preferably holds that components for which an identifier is deposited in the database are the responsibility of the authorized person/the authorized company, which is particularly preferably assured by contract.

If such an entry is found in the database, then the certificate request for the relevant component is preferably approved/validated. If no such entry is found, on the other hand, then it is expediently denied and a requested certificate is therefore not created.

The database can, for example, be provided by an "industrial mall" from the company Siemens.

When a database is used, it is possible for the database to comprise both its own customer data and data from third-party providers, such as OEMs.

In step e), key material can be transmitted to the certification module together with the publicly trusted certificate. The certification module can preferably transfer certificates to a protected memory of the installation component/industrial component in a way that is protected against concurrent reading and modification. The installation component/industrial component itself can then preferably use the certificate to safeguard a web server or other aspects.

In contrast, for example, to manual certificate acquisition, the approach in accordance with disclosed embodiments of the invention complies with the following aspects:
  A person/company provides legally binding confirmation of being the owner of the component, for example, by agreeing to this applying to all purchased components, in particular those deposited in a database, or by virtue of it being known (for sure) who the owner/responsible party is (a legal assurance can also be made within the framework of the certificate acquisition, such as in an engineering system).
  The (respective) component for which a requested certificate is supposed to apply is uniquely identifiable by the certification module.
  The certification module additionally ensures that the certificate and any key material never becomes directly accessible by the person/the company, in particular the customer, but rather can be installed exclusively in the predetermined and associated target component in a secure manner.

This ensures that a certificate can be installed exclusively on a component for which there is a legally responsible owner. This is without there being a requirement for the registration authority and/or the certificate authority to have access to the component or a web server of a component.

It should be noted that the method in accordance with disclosed embodiments of the invention is suitable both for the initial (first-time) awarding of a publicly trusted certificate and for certificate update (renewed awarding). The method in accordance with disclosed embodiments of the invention for awarding certificates is therefore a method for initially awarding and/or updating publicly trusted certificates.

Certificate requests can accordingly be requests for the purpose of both initial application (bootstrapping) and update of certificates.

The certification module is preferably in situ at the technical installation, in particular in the same network as the technical installation. It is in particular implemented on hardware that forms part of the technical installation and/or of the network of a technical installation.

In a quite particularly preferred embodiment, the certification module is part of an engineering system of the technical installation or functionally connected to an engineering system of the technical installation.

Industrial engineering systems, also known as project engineering tools for industrial applications, can be used for solution design and implementation and also for later operating and/or management processes. Here, solutions should be understood to mean industrial solutions in particular for the process industry and/or the discrete industry.

The engineering of an automation project (e.g., for an installation) generally comprises one or more of the following steps: determining the required functionality in the project, determining which components are needed in order to provide this functionality, associating functionality and an actual physical position with the components in the installation, assigning communication structures to the components (e.g., which components can communicate with which other components and how they communicate, what the actual purpose of the component is), etc.

An automation project correlates with a real project, e.g., the setup of a new production/manufacturing line in a new or existing industrial installation or a new or existing process installation. Some of many examples in which such automation projects are realized are the production of vehicles in the automotive industry, the production of electronics, the production of food and beverage products and many more.

In these applications, the engineering system is generally used to produce one or more configurations for installation/automation components within the framework of a project for industrial automation. The industrial automation projects can be, for example, factory automation projects, projects for automating the process industry and all other automation projects in an industrial context.

An installation or automation component can be a hardware component and/or a software component or a combination of the two, in particular for use in the aforementioned automation project. Installation or automation components comprise, among other things: programmable logic controllers (PLC), I/O modules, industrial communication devices, industrial network components, sensors, actuators, drives and other industrial devices that are frequently used in the process or automation industry. Software components that share hardware with other components are likewise configurable by way of an engineering system.

An engineering system (sometimes also referred to as an engineering tool) has very precise knowledge of the automation products in the installation. As such, the engineering system knows the exact hardware (e.g., from the serial number) or the specific product (e.g., from the MLFB, i.e., the machine-readable product designation), but is also capable of uniquely identifying, or rendering identifiable, a component, such as a device (e.g., via a permanently burned-in or securely installed machine or device certificate). Similarly, an engineering system generally already has ways of securely transferring data to the appropriate automation devices (in the sense of the data being tamper-proof and unable to be viewed or concurrently read by third parties).

It should be noted that even if it is very advantageous when the certification module is integrated in an engineering system of the installation, the certification module is also not excluded from being a stand-alone tool or stand-alone module or forming part of another tool. There is then preferably a functional connection to the engineering system. As a result, the tool can also change network, such as if the installation component/industrial component acts in a network that is not only unreachable from the outside but is also itself unable to make outside contact with other networks. This case refers to completely isolated networks.

The disclosed embodiments of the invention afford several advantages. For installations, it is possible to obtain a certificate creation and deployment process that is integrated in the engineering and in particular bound by customer agreement.

In particular the integration into the engineering affords extended, simpler and more secure handling, for example, a much smaller hurdle than when integrating a standardized protocol into any installation component/any product. The engineering system knows device-specific access and distribution channels naturally.

Support for offline engineering becomes possible, this being out of the control of systems such as LetsEncrypt, for example, but being elementary for the engineering of a technical installation.

CSR generation and/or transmission by the certification module, which is preferably integrated in the engineering system, becomes possible, possibly even before the actual device is present and is installed.

Deployment of a certificate and possibly any key material can occur in the course of download or startup, again preferably with the support of the engineering.

Indirect offline scenarios also become possible (e.g., on special SD cards for SIMATIC PLCs or HW Dongle SiPlug).

A technical relationship of trust between a certificate authority (CA) and installation components, such as terminals, can be maintained because the one component identifier (that is, one or more unique features) can be taken as a basis for identifying a customer and the devices actually purchased thereby.

The necessary steps can occur automatically in this case without a user or customer needing to intervene manually.

No infrastructure is required for the certificate management in the components, in particular with the customer. Instead, the certification module, which is preferably part of an engineering system of the installation or functionally connected to such an engineering system, obtains the certificates from a preferred external CA.

Certificate obtainment can be delivered as a service (Certificate as a Service, CaaS), for example, for customers that have purchased an installation component that needs to be certified.

The certification module can be a functional unit that may be implemented by a software component on suitable hardware, for example. It may be that the certification module is implemented by software that is on hardware of a/the engineering system of the technical installation. Naturally, it is also possible for the certification module to comprise separate "dedicated" hardware. In a preferred embodiment, the certification module or the hardware thereof is then functionally connected to a/the engineering system of the technical installation.

A registration authority of a technical installation is understood to mean a functional instance that receives registration requests such as certificate requests from components of the technical installation, checks these requests and, in the event of success, in particular forwards them to a certificate authority of the technical installation. In the present case, the registration authority is provided especially for the purpose of handling certificate requests from installation components of the technical installation. The registration authority can be a local registration authority that can communicate with a higher-level global registration authority, which can, for example, in turn be directly in contact with a certificate authority of the technical installation. The registration authority can comprise a registration service or may be provided by a registration service.

The registration authority to which the certification module transmits, in accordance with disclosed embodiments of the invention, the at least one component identifier together with the certificate request is configured to use the at least one component identifier, i.e., to use one or more unique features, to ascertain/check/validate whether the (respective) component is associated with a person/a company and is the responsibility thereof, in particular whether there is a legally binding customer relationship for the (respective) component.

It may also be that the registration authority ascertains/checks/validates for which application on the at least one component the requested publicly trusted certificate is intended. The registration authority is then configured accordingly.

The technical installation is in particular a manufacturing or process installation. It may be, for example, an installation from the process industry, such as a chemical, pharmaceutical or petrochemical installation, or an installation from the food, beverage and tobacco industry. This also covers any installations from the production industry, factories in which, e.g., cars or goods of all kinds are produced. Technical installations suitable for performing the method in accordance with disclosed embodiments of the invention can also come from the field of energy generation. Wind turbines, solar installations or power stations for energy generation are also covered by the term technical installation.

These installations generally each have a control system or at least one computer-aided module for controlling and regulating the process or production taking place.

The term "public key infrastructure" (PKI) is associated with a security infrastructure for a technical installation that provides services for secure interchange of data between communication partners of the technical installation. The public key infrastructure can be used to issue, distribute and examine certificates.

A certificate is understood to mean a digital dataset that confirms specific properties (in this case properties of machines, devices, and/or applications). An authenticity and integrity of the certificate can be verified via cryptographic methods. Publicly trusted certificates are intended to be understood to particularly mean certificates that are verifiable in the entire certificate chain, all the way up to generally acknowledged trusted root certificates (TRC). Publicly trusted certificates can also be referred to as publicly acknowledged certificates. Publicly trusted/acknowledged certificates are in particular certificates that are issued by members of the CA/browser forum. Particularly preferably, publicly trusted/acknowledged certificates requested/awarded within the framework of the method according to the invention are Secure Sockets Layer (SSL) or Transport Layer Security (TLS) certificates.

An installation component can be, for example, a control apparatus, such as a programmable logic controller (PLC), a device, in particular a field device, and/or an application. It is in particular an automation component or an automation device.

The at least one installation component preferably has at least one web server or is a web server.

A certificate management protocol can be used in order to transmit the at least one certificate request from the certification module to the registration authority. This can be an established protocol that is usually used within the context of certificate management for a technical installation, in particular a control system of a technical installation, for example the Certificate Management Protocol ((CMP), see, e.g., RFC 4210/4211 of the Internet Engineering Task Force (IETF)). CMP can be implemented via https, in particular. It should be emphasized that a standard protocol can be used, but does not have to be. The certification module and the RA can also communicate with one another on a purely proprietary basis.

Multiple embodiments can be supported within the framework of the method in accordance with disclosed embodiments of the invention, in particular:

- online engineering: the components (or servers) are already installed in the installation. The certification module can read features here, uniquely identify a component (and ensure that there is no other instance having the same features) and securely transfer data and certificates to the component.
- offline engineering: the components (servers) are not yet installed in the installation, but rather the installation is possibly still being configured at first. Here, the certification module may first need to produce the at least one component identifier required for the target component (i.e., one or more unique features, e.g., a machine certificate). Publicly trusted certificates can now already be requested and produced in advance, however, and kept in the certification module internally for the configured device. Later, during startup, the certification module then preferably ensures that the at least one preferably unique component identifier (i.e., unique features) is actually present, or can be introduced in a tamper-proof manner and is then preferably introduced. If this has been ensured, the publicly trusted certificate can also be transferred thereto.

A further advantageous embodiment is therefore distinguished in that if the certification module has not retrieved a component identifier during step a) (in particular because the at least one component was not yet in operation (offline) scenario), then the certification module, before transmitting the publicly trusted certificate to the at least one component and/or the storage device connected or connectable to the at least one component, retrieves at least one component identifier from the at least one component and preferably transmits the retrieved component identifier to the registration authority. The component identifier that is (then) retrieved can be transmitted to the registration authority. The registration authority can file the component identifier in a database.

Alternatively or additionally, there can be provision for the certification module, before transmitting the publicly trusted certificate to the at least one component and/or the storage device connected or connectable to the at least one component, to check whether an at least one component identifier generated by the certification module during step b) can be stored/filed in the component in a tamper-proof manner.

Indirect offline case: in particular in automation, the special case exists that sometimes it is not the actual component at all but rather a representative that is provided with the configuration. As such, e.g., an SD card or a (USB) dongle can receive the complete configuration for a controller (for example, PLC) when downloaded, but the actual component in the case of spare parts can be replaced immediately. The download thus occurs only indirectly onto the actual component. Here, however, the representative, such as the card or the (USB) dongle, needs to be uniquely identifiable and needs to be protected against illegal access (the data in the protected area must thus not be readily readable). The relevant/respective component can then take the configuration from the representative, for example, the SD card or the dongle. The certificate should preferably be encrypted and, preferably, only the relevant/respective component should be capable of decrypting the certificate when reading in the configuration.

The certification module expediently has (at least at one time or another) access to the component that is to be validated or a storage device that is a representative, such as an SD card or a dongle. This applies in particular if the certification module is part of an engineering system or is functionally connected to an engineering system.

In particular in the online case, the publicly trusted certificate (possibly with accompanying material) can preferably be encrypted directly for the target component. This ensures that the certificate is continuously safeguarded and can be decrypted only there. In addition, each project in the engineering system can be provided with a customer-specific key, which means that in the offline case the certificate authority (CA) can safeguard the transport at least as far as the certification module. In the respective project, the material for the specific component, for example, the specific terminal, can in turn be encrypted. Continuous safeguarding is therefore likewise possible.

There can be provision that if the result of the check in step c) is that multiple components related to the at least one component identifier are associated with at least one authorized person or at least one authorized company, in particular are the property of at least one authorized person or at least one authorized company, then the available number of potential hits that is in particular deposited in a database is reduced by one. By way of example, a database can particularly comprise an entry according to which a user/a person/a company has a specific number of automation components of a given type. Following approval of a certificate request or following issue of a certificate for such a component, the number would be reduced by one. If the certificate is then installed, an in particular unique component identifier is preferably restored, i.e., transmitted to the database and stored there. Certificate updates should then no longer be performed for such "general hits" as far as possible, but rather for the specific identifier.

In a further advantageous embodiment of the method in accordance with the invention, during step d) the registration authority requests the publicly trusted certificate from a certificate authority, in particular by validating the certificate request and/or forwarding the certificate request to the certificate authority. The certificate authority can then create or obtain the requested publicly trusted certificate for the at least one component.

The certification module additionally preferably transmits the publicly trusted certificate transmitted to it during step e) to the at least one component and/or to a storage device connected or connectable to the at least one component. A storage device is preferably a "representative", such as an SD card, a (USB) dongle or another storage medium, onto which a configuration for the component can be/is installed.

Key material can be transmitted together with the publicly trusted certificate. The key material is particularly key material that has been transmitted to the certification module together with the certificate, in particular by a certificate authority.

The publicly trusted certificate is preferably filed in a tamper-proof certificate memory of the at least one component and/or of the storage device connected or connectable to the at least one component.

A direct connection can exist or be made between the certification module, or between hardware upon which the certification module is implemented, and the at least one component and/or the storage device connected or connectable to the at least one component for the purpose of transmitting the publicly trusted certificate from the certification module to the at least one component and/or to the storage device connected or connectable to the at least one component. Here, "direct" should in particular be understood to mean that the certification module can communicate with the component "directly". It preferably means that the certification module is in the same network as that from which the component is reachable, and no mediator is necessary. There may be a point-to-point connection between the certification module (or hardware on which the certification module is implemented) and the at least one component (for example, serial cable connection, and/or USB cable). It is in particular possible for a direct wired or wireless connection to exist or be made.

The same can apply for the retrieval of the at least one component identifier. As such, there can be provision that during step b) the certification module retrieves the at least one component identifier from the at least one component, for which purpose a direct connection exists or is made between the certification module, or between hardware on which the certification module is implemented, and the at least one component.

It is also an object of the invention to provide a system for awarding publicly trusted certificates for installation components of a technical installation, where the system comprises a certification module and a registration authority, and where the certification module is configured to retrieve at least one preferably unique component identifier from at least one installation component that is supposed to receive a publicly trusted certificate, and/or to generate at least one preferably unique component identifier for at least one installation component that is supposed to receive a publicly trusted certificate, and the registration authority is configured to use the at least one component identifier to check whether the at least one component related to the component identifier is associated with at least one authorized person or at least one authorized company, in particular is the property of at least one authorized person or at least one authorized company, and, if this is the case, to request a publicly trusted certificate for the at least one component, and where the certification module is further configured to receive the requested publicly trusted certificate and preferably to store the requested publicly trusted certificate in a protected area.

The system in accordance with the invention is particularly suitable for implementing the method in accordance with disclosed embodiments of the invention.

In an embodiment, the system additionally comprises a database that stores component identifiers together with related authorized persons and/or companies that are preferably the owner of related components, and the registration authority is configured so as, for or as part of the check to establish whether the at least one component related to the component identifier is associated with at least one authorized person or at least one authorized company, to search the database for at least one entry for the at least one component identifier transmitted together with the certificate request.

The certification module preferably forms a (local) frontend or a (local) frontend unit of the system, or form part of one. The registration authority is (possibly together with a database and a certificate authority) preferably part of a (central) backend or a central backend unit of the system. The certification module is preferably in situ at or in the technical installation, whereas the registration service is preferably remote therefrom, for example, in a computer center.

The registration service can in particular be contacted by multiple certification modules, which may be located at/in different installations, and receive certificate requests together with component identifiers.

Besides the registration authority (and possibly a database), a certificate authority can be a further part of a backend/a backend unit of the system. Alternatively or additionally, a separate/external certificate authority can exist that trusts the registration authority of the system according to the invention. A separate/external certificate authority can be provided by a certificate authority, such as VeriSign or another known certificate authority, which preferably has a trusted root certificate (TRC).

It is also an object of the invention to provide an engineering or control system for a technical installation comprising a certification module, which is configured to retrieve at least one preferably unique component identifier from at least one installation component that is supposed to receive a publicly trusted certificate, and/or to generate at least one preferably unique component identifier for at least one installation component that is supposed to receive a publicly trusted certificate.

The engineering or control system is further configured to transmit the at least one retrieved and/or at least one generated component identifier together with a certificate request for a publicly trusted certificate for the at least one component to a registration authority (RA), and to receive a publicly trusted certificate for the installation component and preferably to store said publicly trusted certificate in a protected area.

The certification module can comprise an inspection unit and/or a deployment unit.

If there is an inspection unit, then this is preferably configured to retrieve (i.e., read) at least one preferably unique component identifier from the at least one component that is supposed to receive the publicly trusted certificate, and/or to generate at least one preferably unique component identifier for the at least one component that is supposed to receive the publicly trusted certificate.

If there is a deployment unit, then this is preferably configured to transmit a created publicly trusted certificate to the (respective) component, i.e., install the certificate on the component. It is preferably configured to receive publicly trusted certificates created by a certificate authority so as to then be able to forward the certificates to the (respective) component.

It is a further object of the invention to provide a technical installation, in particular manufacturing or process installation. The technical installation in accordance with the invention preferably comprises at least one engineering or control system in accordance with disclosed embodiments of the invention.

The approach in accordance with disclosed embodiments of the invention alternatively or additionally also allows a gateway device and/or edge device to be used. In particular, there can be provision for the certification module to be provided/implemented on an edge device. The certification module can be formed as an application (app) on an edge device, for example. When an edge device is used, the requesting (certificate requests), update and secure loading of publicly trusted certificates on the components, for example, devices in the local area network of a technical installation, can occur fully automatically, while the gateway/edge device also permits access to the Internet and the public infrastructure. An edge device is expediently (as the name suggests) located at the outer edge of the self-contained network and has two network accesses/network adapters. The edge device is thus then in particular located both in the self-contained internal network and in the public Internet. The devices or components in the self-contained network, on the other hand, usually have no access to the Internet. This is particularly convenient for automatic update during operation, because the engineering system is not needed and the certification module is also not first used internally to receive the identifier, so as to then thus change to the public Internet manually.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the description of embodiments in accordance with the invention that follows with reference to the accompanying drawings, in which.

DETAILED DESCRIPTION OF THE EXEMPLARY EMBODIMENTS

Figure 1:
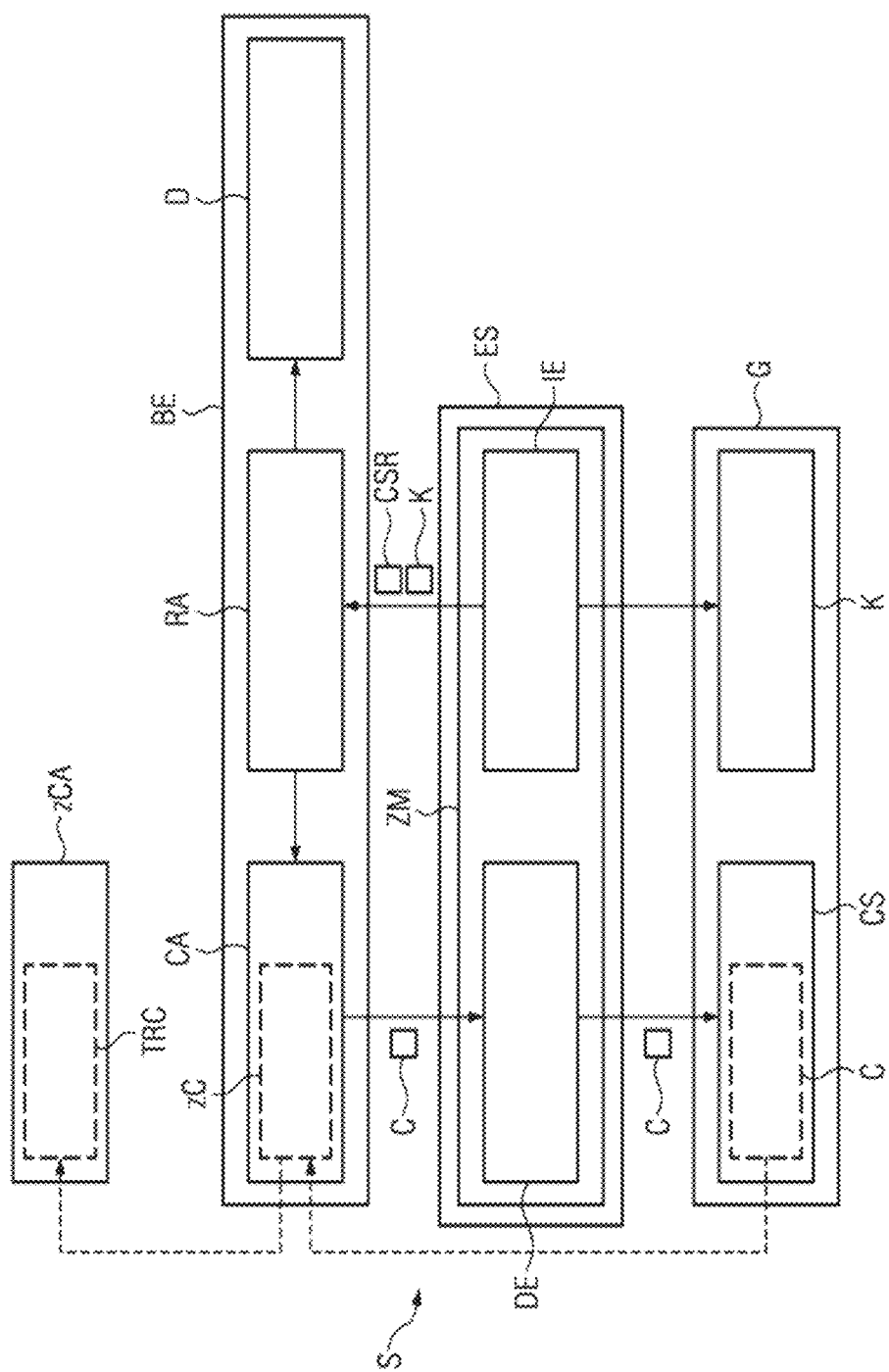
FIG. 1 is a schematic block diagram of an installation component and an exemplary embodiment of a system for awarding publicly trusted certificates in a purely schematic depiction in accordance with the invention.

FIG. 1 shows an installation component G and an exemplary embodiment of a system in accordance with the invention for awarding publicly trusted certificates in a purely schematic depiction.

In the currently described example, the installation component G is provided by a programmable logic controller (PLC), and forms part of a technical installation, in particular a manufacturing or process installation, which is not depicted further. The installation also comprises, among other things, in a manner that is known per se, a plurality of sensors, which deliver measured values for the controller G, and actuators, which receive values of manipulated variables from the controller G. As such, a process occurring in the installation can be monitored and influenced.

The controller G is connected to the sensors and actuators and also further installation components via an installation network in a manner that is known per se. The installation network is a self-contained local area network and the controller G is unreachable from the outside via the Internet.

The controller G is distinguished by a unique component identifier K that, in the exemplary described embodiment, is provided by a device certificate K.

In particular, in order to also allow users to be able to look at data of the controller G on mobile terminals, the controller G is supposed to receive a certificate.

In the case of browsers on client terminals, this requires certificates in the entire certificate chain, all the way up to generally acknowledged trusted root certificates TRC to be verifiable (see, for example, the Root CA Policy of Google Chrome). The latter are a handful of certificates that are classified as trusted across browsers and operating systems and do not need to be installed individually.

The controller G, or a web server thereon, is supposed to receive such a certificate that is verifiable all the way up to a trusted root certificate TRC, also referred to as a publicly trusted certificate C.

The controller G has a tamper-proof certificate store CS that is used in a manner known per se to securely keep or store a digital certificate. The certificate store CS can be used to file such a publicly trusted certificate C.

In order to be able to issue publicly acknowledged (trusted) certificates C, a CA needs to be able to ensure that the person requesting certificates or the company requesting certificates actually has control over and/or responsibility for the component, or a server implemented thereon, and the domain pointing thereto. Based on the prior art, this can be assured by way of the applicable component/the applicable server being reachable—which is not the case in the industrial installation, however.

There is therefore provision for a system S in accordance with the invention for awarding publicly trusted certificates C for installation components G of a technical installation, where the system can be used to obtain such a certificate C for the controller G and to file the certificate therein (also referred to as deployment).

The exemplary embodiment of such a system S in accordance with the invention that is depicted in FIG. 1 comprises a certification module ZM, which is a frontend unit or frontend component of the system 1 and is in situ at or in the technical installation. In the present case, the certification module ZM is integrated into an engineering system ES of the technical installation. It is specifically a functional unit or a functional module implemented by software located on hardware of the engineering system ES. The engineering system forms part of the depicted exemplary embodiment of a system S in accordance with the invention for awarding publicly trusted certificates. The engineering system ES can run on standard hardware, such as an ordinary PC or industrial PC.

It should be noted that as an alternative to the certification module ZM (as in the example depicted) being integrated in an engineering system S of the installation, the certification module can also be a stand-alone tool or stand-alone module or part of another tool. There is then expediently a functional connection between the engineering system ES and the certification module ZM. The certification module ZM may also be implemented on an edge device that is located at the outer edge of the self-contained installation network and has two network accesses/network adapters, which means that it is located both in the self-contained internal installation network and in the public Internet.

The engineering system ES has very precise knowledge of the automation products in a technical installation. As such, it knows the exact hardware (e.g. from the serial number) or the specific product (e.g., from the MLFB), but is also capable of uniquely identifying, or rendering identifiable, a component, such as the controller G (e.g., via a permanently burned-in or securely installable machine or device certificate). Similarly, the engineering system ES generally already has ways of securely transferring data to the appropriate components, for example, automation devices (in the sense of the data being tamper-proof and not able to be viewed or concurrently read by third parties).

The system S in accordance with the invention comprises not only the engineering system ES containing the certification module ZM but additionally a backend or a backend unit BE containing a registration authority RA, a database D and a certificate authority CA. The backend or the backend unit BE is not arranged in situ at the installation, but rather is located in a computer center that is a few or many kilometers away from the installation, for example. Communication between the certification module ZM and the backend BE is possible via the public Internet.

The circumstance that the engineering system ES containing the certification module ZM and the controller G are in situ at or in the technical installation, specifically form part thereof, in contrast to the backend BE, is indicated in FIG. 1 by a brace at the edge that combines the components in situ.

The certification module ZM is configured to communicate with components G of the installation.

The certification module ZM comprises an inspection unit IE configured to retrieve (i.e., read) preferably unique component identifiers K from components G that are supposed to receive a publicly trusted certificate C and to generate preferably unique component identifiers K for components G that are supposed to receive a publicly trusted certificate C. The retrieval, or probing, is indicated in FIG. 1 by an arrow that points from the inspection unit IE to the device certificate forming the component identifier K.

The inspection unit IE is further configured to transmit retrieved and/or generated component identifiers K, in each case together with a certificate request CSR for a publicly trusted certificate C for the respective component G, to the registration authority RA. The transmission is indicated in FIG. 1 by an arrow that points from the inspection unit IE to the registration authority RA, beside which a certificate request CSR for the controller G together with the device certificate K of the controller G is depicted purely schematically by way of illustration.

The certification module ZM additionally has a deployment unit DE configured to transmit publicly trusted certificates C to the (respective) component G, i.e., in order to install the certificates on the component. The deployment unit is configured to receive publicly trusted certificates C created or obtained by the certificate authority CA and then to forward these certificates to the (respective) component G. This is indicated in FIG. 1 by arrows that point from the certificate authority CA to the deployment unit DE and from the deployment unit to the certificate store CS of the controller G and beside each of which a certificate C is depicted purely schematically.

The registration authority RA is configured to use the at least one component identifier K to check whether the at least one component related to the component identifier K, in the present case the controller G, is associated with at least one authorized person or at least one authorized company, in particular is the property of at least one authorized person or at least one authorized company, and, if this is the case, to request a publicly trusted certificate C for the at least one component G. The registration authority RA is capable of using transmitted unique component features K to validate a legally binding customer association.

The depicted exemplary embodiment of a system S in accordance with the invention can be used to implement an exemplary embodiment of the method in accordance with the invention for awarding publicly trusted certificates C for installation components G of a technical installation.

In a first step, the certification module ZM retrieves at least one preferably unique component identifier, in the present case the device certificate K, from the controller G, which is supposed to receive a publicly trusted certificate. The certification module ZM, which in the present case is integrated in the engineering system of the installation, has direct access to the controller G, which means that this retrieval is possible without difficulty. The engineering system G is a subscriber in the self-contained installation network, which means that it—and therefore the integrated certification module ZM—has access to the controller G.

As an alternative or in addition to retrieving/reading the at least one component identifier K, the certification module ZM can also generate at least one preferably unique component identifier, in the present case a (possibly temporary) device certificate, for the controller G that is supposed to receive a publicly trusted certificate.

This is advantageous especially if at least one component, such as the controller G, has not yet been started up, but rather this is possibly still being configured at first. In other words, offline or advance engineering is also supported. This also makes it possible to not require presence of the engineering system ES in the installation network (yet). The generation of at least one unique identifier K by the certification module ZM renders the components uniquely identifiable. Publicly trusted certificates C can then already be requested and produced in advance and kept in the certification module ZM internally for the configured component G. Later, during startup, the certification module ZM then preferably ensures that the at least one component identifier K is actually present, or can be introduced in a tamper-proof manner. If this has been ensured, the publicly trusted certificate C can also be transferred thereto.

Subsequently to the retrieval and/or generation of the at least one component identifier, in the present case, the retrieved device certificate K, the certification module ZM transmits said device certificate, together with a certificate request CSR for a publicly trusted certificate C for the controller G, to a registration authority RA.

The certificate request CSR that the certification module ZM transmits to the registration authority RA can be, or may have been, created by the certification module ZM or perhaps by the controller G.

The registration authority RA then uses the device certificate K to check whether the at least one controller G related to the component identifier K is associated with at least one authorized person or at least one authorized company that has responsibility for the controller. In the exemplary illustrated embodiment, this check is performed by virtue of the registration authority RA searching the database D, which stores component identifiers K, among other things device certificates K, together with related authorized persons and/or companies that are the owner of components G related to the component identifiers K, for at least one entry for the component identifier, in the present case the device certificate K of the controller G, transmitted together with the certificate request CSR.

If an entry for the component identifier K transmitted with the certificate request CSR is found in the database, then the certificate request CSR is approved/validated by the registration authority RA.

It should be noted that such an entry in the database has preferably been created after a customer has purchased the controller G and has therefore become the owner. The callup or the search in the database D can therefore be used to check whether the controller G is in the possession of an authorized customer.

Furthermore, it should be noted that it is naturally also possible for multiple components of identical design, such as controllers G, which are associated with a person or a company, in particular belong to a person or a company, to exist according to the database D. If this is the case, then the certificate request CSR is approved and the number of potential hits, i.e., components G of identical design, in the database is reduced by one.

In a next step, the registration authority RA requests the publicly trusted certificate C from the certificate authority CA, in particular by forwarding the certificate request CSR to the certificate authority CA.

The certificate authority CA then creates or obtains the requested publicly trusted certificate C for the controller G. In the presently described example, this involves the certificate authority CA, which is part of the backend BE, contacting a further, central certificate authority zCA that has a trusted root certificate TRC. The zCA has a relationship of trust with the CA. Consequently, the CA performs the CSR directly.

A certificate C is created by or in the registration authority CA or zCA of the backend BE.

The certificate C is forwarded together with related key material to the deployment unit DE of the certification module ZM, and stored in a protected area, which cannot be read or altered from outside, there or at another location in the engineering system Es.

The certificate C and related key material are further deployed, i.e., introduced into the controller G, specifically securely filed in the certificate store CS, by the deployment unit. This is again indicated in FIG. 1 by appropriate arrows. In the exemplary illustrated embodiment, the certificate C (can also be referred to as a customer certificate) points at an intermediate certificate zC of the CA, which in turn points at the trusted root certificate TRC of the zCA. This certificate chain is indicated in FIG. 1 by arrows with a dashed line. It can also be said that these arrows indicate the trust, i.e., the confidence, between the authorities or certificates. The TRC is the end of the certificate chain, as evident. The (customer) certificate C in the component G needs to be valid over the entire chain, all the way up to the TRC of the zCA.

It should be noted that a central certificate authority zCA can, but does not have to be, provided, and contacted by the CA. As an alternative to the exemplary embodiment depicted in FIG. 1, it is also possible for the CA to issue certificates C directly without being reliant on external collaboration from a further CA. This is especially so if the CA has valid key material.

If the ES has used a provisional identifier K, which has not been called up but rather has been generated, then the unique identifier K is now retrieved from the component G and transmitted back to the backend BE. There, the provisional identifier can now be replaced with the actual identifier. (If the ES has produced a unique identifier K beforehand and this unique identifier has been able to be introduced into the component G, then the transmission back is dispensed with, or else further characteristics, such as the serial number, are transferred for the purpose of correct association in the database D.)

Additionally, it should be noted that should the RA be unable to find an entry for the component identifier K transmitted with the CSR in the database, then the request CSR would be denied and no certificate C created.

The engineering system ES containing the certification module ZM can support the following three variants:

- Online engineering: the components/servers are already installed in the installation. The ES can read features here, uniquely identify a component G (and ensure that there is no other instance having the same features) and securely transfer data and certificates C to the component G.
- Offline engineering: the components/servers are not yet installed in the installation, but rather the installation is possibly still being configured at first. Here, the engineering system ES may first produce the unique features (at least one component identifier K) required for the target component G (e.g., a machine certificate). Certificates C can then already be requested and produced in advance, however, but kept in the engineering system ES, specifically the certification module ZM, internally for the configured component G. Later, during startup, the ES ensures that the unique features are actually present, or can be introduced in a tamper-proof manner. If this has been ensured, then the certificate C already kept can also be transferred thereto.
- Indirect offline case: in automation, the special case exists that sometimes it is not the actual component G at all but rather a representative, for example, an SD card or a (USB) dongle, that is provided with the configuration. As such, e.g., an SD card/a dongle can receive the complete configuration for a PLC G when downloaded, but the actual controller G in the case of spare parts can be replaced immediately. The download thus occurs only indirectly onto the actual device G. Here, however, the representative, i.e., the SD card/the dongle, needs to be uniquely identifiable and needs to be protected against illegal access—the data in a protected area thereof must thus not be readily readable.

In all three cases, the engineering system ES has access to the components G that are to be validated, at least at one time or another.

In the online case, the certificate C with accompanying material can be encrypted directly for the target component G. This ensures that the certificate C is continuously safeguarded and can be decrypted only there. In addition, each project in the engineering system ES can be provided with a (customer-specific) key, which means that in the offline case the CA can safeguard the transport at least as far as the ES. In the respective project, the material for the specific terminal G can in turn be encrypted. Continuous safeguarding is therefore likewise possible.

It should be noted that the engineering system ES in which the certification module ZM is integrated, or of which the certification module ZM forms a part, is an exemplary embodiment of an engineering system in accordance with the invention in a technical installation, or for a technical installation.

The technical installation of which the controller G and the engineering system ES form a part is further an exemplary embodiment of a technical installation in accordance with the invention.

Figure 2:
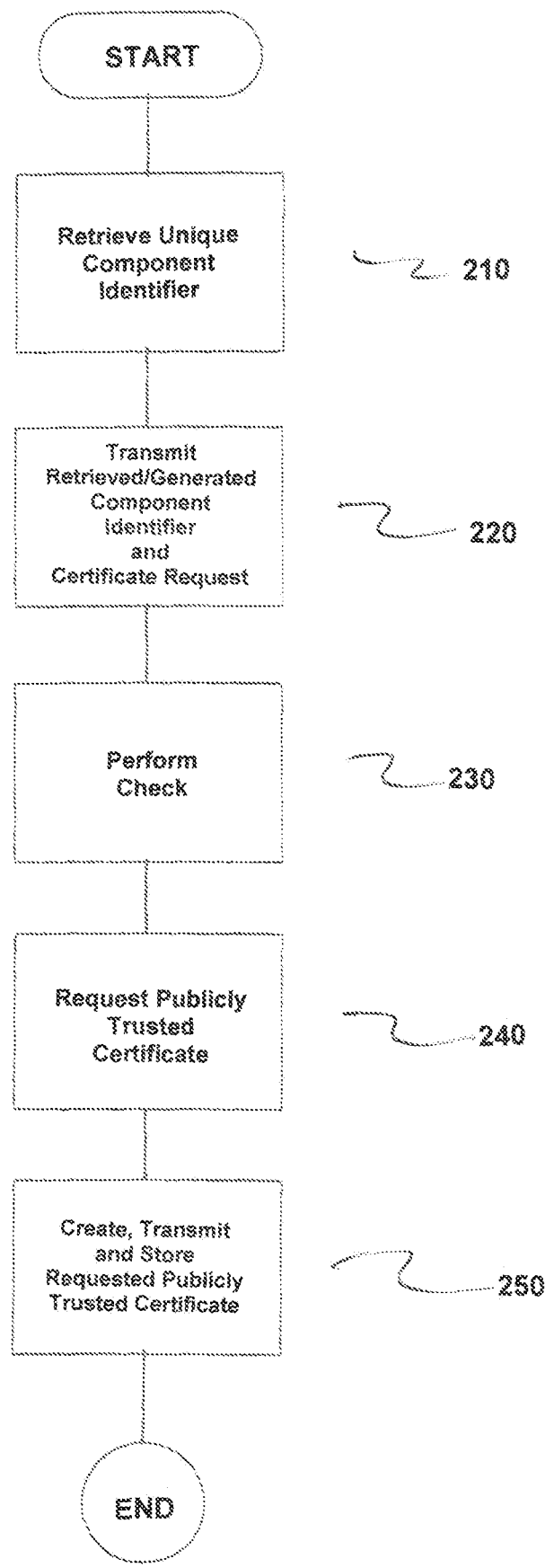
FIG. 2 is a flowchart of the method in accordance with the invention.

FIG. 2 is a flowchart of the method for awarding publicly trusted certificates C for installation components G of a technical installation. The method comprises retrieving, by a certification module ZM, at least one unique component identifier K from at least one installation component G which is supposed to receive a publicly trusted certificate C, and/or generating, by the certification module ZM, at least one preferably unique component identifier K for at least one installation component G which is supposed to receive a publicly trusted certificate C, as indicated in step 210.

Next, at least one of the at least one retrieved component identifier K and (ii) the least one generated component identifier K is transmitted by the certification module ZM together with a certificate request CSR for a publicly trusted certificate C for the at least one component G to a registration authority RA, as indicated in step 220.

Next, the registration authority RA uses the at least one component identifier K to check whether the at least one component G related to the component identifier K is associated with at least one authorized person or at least one authorized company which bears responsibility for the at least one component G, as indicated in step 230.

Next, the registration authority RA requests a publicly trusted certificate C for the at least one component G, if the at least one component G related to the component identifier K is associated with at least one authorized person or at least one authorized company which bears responsibility for the at least one component G, as indicated in step 240.

Next, the requested publicly trusted certificate C is created and transmitted to the certification module ZM and the requested publicly trusted certificate C is stored in a protected area of the certification module ZM, as indicated in step 250.

Although the invention has been illustrated and described more thoroughly in detail via the preferred exemplary embodiments, the invention is not limited by the disclosed examples, and other variations can be derived therefrom by a person skilled in the art without departing from the scope of protection of the invention.

By way of example, it should be understood that even if the embodiments in accordance with the invention have been explained above by way of illustration based on a component of a technical installation, specifically a controller G, publicly trusted certificates C can naturally be requested and if necessary created for any number of further components in a corresponding manner and transmitted to said components. In this case, a certification module ZM or a system S in accordance with the invention can be used for multiple components of a technical installation (or perhaps multiple technical installations).

In particular the backend BE of a system in accordance with the invention can also be a control center that communicates with multiple certification modules ZM and creates publicly trusted certificates C at the requests of multiple certification modules ZM, possibly of different installations, and transmits the certificates to the multiple certification modules ZM.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for awarding publicly trusted certificates for programmable logic controllers of a technical installation, the method comprising:
   a) retrieving, by a certification module, at least one unique component identifier from at least one programmable logic controller which is supposed to receive a publicly trusted certificate, and/or generating, by the certification module, at least one preferably unique component identifier for at least one programmable logic controller which is supposed to receive a publicly trusted certificate, the certification module including a deployment unit and an inspection unit, the deployment unit being configured to transmit publicly trusted certificates to respective programmable logic controllers for installation of the certificates on the at least one programmable logic controller and being configured to receive publicly trusted certificates created or obtained by a certificate authority and subsequently forward these certificates to the respective programmable logic controllers, and the inspection unit being configured to retrieve unique component identifiers from programmable logic controllers which are supposed to receive a publicly trusted certificate and to generate unique component identifiers for components which are supposed to receive a publicly trusted certificate;
   b) transmitting, by the certification module, at least one of the at least one retrieved component identifier and (ii) the at least one generated component identifier together with a certificate request for a publicly trusted certificate for the at least one programmable logic controller to a registration authority;
   c) utilizing, by the registration authority, the at least one component identifier to check whether the at least one programmable logic controller related to the component identifier is associated with at least one authorized person or at least one authorized company which bears responsibility for the at least one programmable logic controller;
   d) requesting, by the registration authority, a publicly trusted certificate for the at least one programmable logic controller, if the at least one programmable logic controller related to the component identifier is associated with at least one authorized person or at least one authorized company which bears responsibility for the at least one programmable logic controller; and
   e) creating and transmitting the requested publicly trusted certificate to the certification module and storing said requested publicly trusted certificate in a protected area of the certification module.

2. The method as claimed in claim 1, wherein during said step d) the registration authority requests the publicly trusted certificate from the certificate authority by at least one of (i) validating the certificate request and (ii) forwarding said certificate request to the certificate authority, and the certificate authority creates or obtains the requested publicly trusted certificate for the at least one programmable logic controller.

3. The method as claimed in claim 1, wherein the certification module transmits the publicly trusted certificate to the at least one programmable logic controller or to a storage device connected or connectable to the at least one programmable logic controller; wherein the publicly trusted certificate is filed in a tamper-proof certificate memory of the at least one programmable logic controller or of the storage device connected or connectable to the at least one programmable logic controller.

4. The method as claimed in claim 2, wherein the certification module transmits the publicly trusted certificate to the at least one programmable logic controller or to a storage device connected or connectable to the at least one programmable logic controller; wherein the publicly trusted certificate is filed in a tamper-proof certificate memory of the at least one programmable logic controller or of the storage device connected or connectable to the at least one programmable logic controller.

5. The method as claimed in claim 3, wherein a direct connection exists or is made between the certification module, or between hardware on which the certification module is implemented; and
   wherein at least one of (i) the at least one programmable logic controller and (ii) the storage device connected or connectable to the at least one programmable logic controller to transmit the publicly trusted certificate from the certification module to at least one of (i) the at least one programmable logic controller and (ii) the storage device connected or connectable to the at least one programmable logic controller.

6. The method as claimed in claim 3, wherein if the certification module has not retrieved a component identifier in step a) then the certification module, before transmitting the publicly trusted certificate to the at least one programmable logic controller, retrieves at least one component identifier from the at least one programmable logic controller and transmits the retrieved component identifier to the registration authority.

7. The method as claimed in claim 5, wherein if the certification module has not retrieved a component identifier in step a) then the certification module, before transmitting the publicly trusted certificate to the at least one programmable logic controller, retrieves at least one component identifier from the at least one programmable logic controller and transmits the retrieved component identifier to the registration authority.

8. The method as claimed in claim 1, wherein the certificate request that the certification module transmits to the registration authority in step b) is created by the certification module or by the at least one programmable logic controller.

9. The method as claimed in claim 1, wherein if the result of the check during step c) is multiple programmable logic controllers related to the at least one component identifier are associated with at least one authorized person or at least one authorized company, in particular are the property of at least one authorized person or at least one authorized company, then an available number of programmable logic controllers related to the at least one component identifier deposited in a database is reduced by one.

10. The method as claimed in claim 1, wherein multiple programmable logic controllers related to the at least one component identifier comprise property of at least one authorized person or at least one authorized company.

11. The method as claimed in claim 1, wherein at least one of (i) a serial number, (ii) a device or machine certificate, (iii) a fingerprint and (iv) a type designation is at least one of retrieved and generated as component identifier in step a).

12. The method as claimed in claim 1, wherein the check during step c) includes the registration authority searching a database, which stores component identifiers together with at least one of (i) related authorized persons and (ii) companies which own related programmable logic controllers, for at least one entry for the at least one component identifier transmitted together with the certificate request.

13. The method as claimed in claim 1, wherein during step b) the certification module retrieves the at least one component identifier from the at least one programmable logic controller, for which purpose a direct connection exists or is made between the certification module, or between hardware on which the certification module is implemented, and the at least one programmable logic controller.

14. The method as claimed in claim 1, wherein the certification module is in situ at the technical installation.

15. The method as claimed in claim 14, wherein the certification module is implemented on hardware that forms part of at least one of (i) the technical installation, (ii) a control system of a technical installation and (iii) hardware that is formed in the same location as the technical installation.

16. The method as claimed in claim 1, wherein the certification module is one of (i) part of an engineering system of the technical installation and (ii) functionally connected to an engineering system of the technical installation.

17. A system for awarding publicly trusted certificates for programmable logic controllers of a technical installation, comprising:
 a certification module including a deployment unit and an inspection unit, the deployment unit being configured to transmit publicly trusted certificates to respective programmable logic controllers for installation of the certificates on a programmable logic controller and being configured to receive publicly trusted certificates created or obtained by a certificate authority and subsequently forward these certificates to the respective programmable logic controllers, and the inspection unit being configured to retrieve unique component identifiers from programmable logic controllers which are supposed to receive a publicly trusted certificate and to generate unique component identifiers for components which are supposed to receive a publicly trusted certificate;
 a registration authority; and
 a database which stores component identifiers together with at least one of (i) related authorized persons and (ii) companies which are owners of related programmable logic controllers;
 wherein the certification module is configured to retrieve at least one unique component identifier from at least one programmable logic controller which is supposed to receive a publicly trusted certificate, and/or configured to generate at least one unique component identifier for the at least one programmable logic controller which is supposed to receive the publicly trusted certificate;
 wherein the registration authority is configured to utilize the at least one component identifier to check whether the at least one programmable logic controller related to the component identifier is associated with at least one authorized person or at least one authorized company, comprising whether the component identifier is the property of at least one authorized person or at least one authorized company, and configured to request a publicly trusted certificate for the at least one programmable logic controller if the at least one programmable logic controller related to the component identifier is associated with at least one authorized person or at least one authorized company based on the at least one component identifier;
 wherein the certification module is further configured to receive the requested publicly trusted certificate and configured to store said requested publicly trusted certificate in a protected area.

18. The system as claimed in claim 17, wherein the system further comprises:
 wherein the registration authority is further configured to, for or as part of the check to establish whether the at least one programmable logic controller related to the component identifier is associated with at least one authorized person or at least one authorized company, search the database for at least one entry for the component identifier transmitted together with the certificate request.

19. An engineering or control system for a technical installation comprising:
 a certification module including a deployment unit and an inspection unit, the deployment unit being configured to transmit publicly trusted certificates to respective programmable logic controllers for installation of the certificates on a programmable logic controller and being configured to receive publicly trusted certificates created or obtained by a certificate authority and subsequently forward these certificates to the respective programmable logic controllers, and the inspection unit being configured to retrieve unique component identifiers from programmable logic controllers which are supposed to receive a publicly trusted certificate and to generate unique component identifiers for components which are supposed to receive a publicly trusted certificate; and
 a database which stores component identifiers together with at least one of (i) related authorized persons and (ii) companies which are owners of related programmable logic controllers;
 wherein the certification module is configured to:
  retrieve at least one unique component identifier from at least one programmable logic controller which is supposed to receive a publicly trusted certificate, and/or to generate at least one unique component identifier for at least one programmable logic controller which is supposed to receive a publicly trusted certificate;
  transmit at least one of (i) the at least one retrieved and (ii) the at least one generated component identifier together with a certificate request for a publicly trusted certificate for the at least one programmable logic controller to a registration authority which requests the publicly trusted certificate for the at least one programmable logic controller if the at least one programmable logic controller related to the component identifier is associated with at least one authorized person or at least one authorized company based on the at least one component identifier;

receive a publicly trusted certificate for the programmable logic controller and store said publicly trusted certificate in a protected area.

20. A technical installation comprising at least one engineering or control system including a certification module having a deployment unit and an inspection unit, and a database which stores component identifiers together with at least one of (i) related authorized persons and (ii) companies which are owners of related programmable logic controllers;

wherein the deployment unit is configured to:
    transmit publicly trusted certificates to respective programmable logic controllers for installation of the certificates on the at least one programmable logic controller and being configured to receive publicly trusted certificates created or obtained by a certificate authority and subsequently forward these certificates to the respective programmable logic controllers;

wherein the inspection unit is configured to retrieve unique component identifiers from programmable logic controllers which are supposed to receive a publicly trusted certificate and to generate unique component identifiers for components which are supposed to receive a publicly trusted certificate; and wherein the certification module is configured to:
    retrieve at least one unique component identifier from at least one programmable logic controller which is supposed to receive a publicly trusted certificate, and/or to generate at least one unique component identifier for at least one programmable logic controller which is supposed to receive a publicly trusted certificate;

transmit at least one of (i) the at least one retrieved and (ii) the at least one generated component identifier together with a certificate request for a publicly trusted certificate for the at least one programmable logic controller to a registration authority which requests the publicly trusted certificate for the at least one programmable logic controller if the at least one programmable logic controller related to the component identifier is associated with at least one authorized person or at least one authorized company based on the at least one component identifier;

receive a publicly trusted certificate for the programmable logic controller and store said publicly trusted certificate in a protected area.

21. The technical installation as claimed in claim 20, wherein the technical installation comprises a production or process installation.

* * * * *